(12) United States Patent
Koo et al.

(10) Patent No.: US 9,021,739 B2
(45) Date of Patent: May 5, 2015

(54) PLANT CULTIVATION APPARATUS FOR PRODUCING THE PLANT HAVING HIGH CONTENT OF GINSENOSIDES

(71) Applicant: Seoul Viosys Co., Ltd., Ansan-si (KR)

(72) Inventors: Jong Hyeon Koo, Ansan-si (KR); Young Hwan Son, Ansan-si (KR); Seong Min Lee, Ansan-si (KR); Jae Seon Yi, Ansan-si (KR); Kil Sun Yoo, Ansan-si (KR); Jung Youl Park, Ansan-si (KR)

(73) Assignee: Seoul Viosys Co., Ltd., Ansan-si (KR)

( * ) Notice: Subject to any disclaimer, the term of this patent is extended or adjusted under 35 U.S.C. 154(b) by 0 days.

(21) Appl. No.: 14/177,827

(22) Filed: Feb. 11, 2014

(65) Prior Publication Data

US 2014/0225003 A1    Aug. 14, 2014

(30) Foreign Application Priority Data

Feb. 14, 2013    (KR) .......................... 10-2013-0015847

(51) Int. Cl.
*A01G 7/04* (2006.01)

(52) U.S. Cl.
CPC . *A01G 7/04* (2013.01); *A01G 7/045* (2013.01)

(58) Field of Classification Search
CPC ................................. A01G 7/04; A01G 7/045
USPC .......... 250/454.11; 47/1.3, 58.1 LS; 362/231, 362/249.01, 249.09
See application file for complete search history.

(56) References Cited

U.S. PATENT DOCUMENTS

| | | | | |
|---|---|---|---|---|
| 3,085,516 A | * | 4/1963 | Cirami | 104/247 |
| 3,872,428 A | * | 3/1975 | Boisvert | 362/396 |
| 4,146,993 A | * | 4/1979 | Freeman, Sr. | 47/17 |
| 4,232,357 A | * | 11/1980 | Dietz | 362/486 |
| 4,328,536 A | * | 5/1982 | Wallmark | 362/427 |
| 7,764,028 B2 | * | 7/2010 | Mariyama et al. | 315/360 |
| 2008/0123354 A1 | * | 5/2008 | Caldani | 362/418 |
| 2008/0192458 A1 | * | 8/2008 | Li | 362/84 |
| 2010/0188867 A1 | * | 7/2010 | Li | 362/556 |
| 2010/0277078 A1 | * | 11/2010 | Morton | 315/152 |
| 2011/0147617 A1 | * | 6/2011 | Shur et al. | 250/461.1 |
| 2011/0252705 A1 | * | 10/2011 | Van Gemert et al. | 47/66.7 |
| 2011/0288964 A1 | * | 11/2011 | Linder et al. | 705/27.1 |
| 2012/0210637 A1 | * | 8/2012 | Kamahara | 47/17 |
| 2013/0008085 A1 | * | 1/2013 | Aikala et al. | 47/58.1 LS |
| 2013/0155672 A1 | * | 6/2013 | Vo et al. | 362/233 |
| 2013/0258684 A1 | * | 10/2013 | Yang et al. | 362/386 |
| 2013/0294065 A1 | * | 11/2013 | Wells | 362/231 |
| 2013/0326950 A1 | * | 12/2013 | Nilles | 47/62 R |
| 2014/0069002 A1 | * | 3/2014 | Morgan et al. | 47/58.1 LS |
| 2014/0140056 A1 | * | 5/2014 | Morgan et al. | 362/231 |

OTHER PUBLICATIONS

Park, S., et. al. "Increase in the Contents of Ginsenosides in Raw Ginseng Roots in Response to Exposure to 450 and 470 nm Light from Light-Emitting Diodes" J Ginseng Res vol. 36, No. 2, 198-204 (2012).*

* cited by examiner

*Primary Examiner* — Nicole Ippolito
*Assistant Examiner* — Wyatt Stoffa
(74) *Attorney, Agent, or Firm* — H.C. Park & Associates, PLC (57) ABSTRACT

A plant cultivation apparatus including: a guide rail disposed above a cultivation bed and extending along the length direction of the cultivation bed; a movable unit configured to move along the guide rail; an arm unit having a first end that is coupled to the movable unit, and a second end that is telescopically extendable from the movable unit toward the cultivation bed; and a UV radiation unit coupled to the second end of the arm unit and configured to irradiate the cultivation bed with a set amount of UV light.

9 Claims, 9 Drawing Sheets

PLANT CULTIVATION APPARATUS FOR PRODUCING THE PLANT HAVING HIGH CONTENT OF GINSENOSIDES

CROSS-REFERENCE TO RELATED APPLICATION

The present application claims priority under 35 U.S.C 119(a) to Korean Application No. 10-2013-0015847, filed on Feb. 14, 2013, which is incorporated herein by reference for all purposes as if fully set forth herein.

BACKGROUND

1. Field

Exemplary embodiments of the present invention relate to an apparatus for cultivating plants such as ginseng, and more particularly, to a ginseng cultivation apparatus for producing ginseng having a high content of ginsenosides.

2. Discussion of the Background

Raw ginseng, red ginseng, black ginseng, and various processed ginseng products contain ginseng saponins called ginsenosides, which are secondary metabolites that show pharmacological effects, including anticancer, anti-inflammation, anti-hypertension, anti-atherosclerosis, nerve system regulation, and immune regulation effects. The content and ratio of these ginseng saponins are important factors that determine the quality of ginseng or processed ginseng products.

Ginseng saponins have chemical structures different from those of saponins found in other plants. In order to distinguish ginseng saponins from saponins found in other plants, ginseng saponins are called "ginsenosides" in the sense of the glycosides being isolated from ginseng.

Ginsenosides are known to have various effects, including anti-diabetic activity, anticancer activity, antioxidative activity, effects on prevention of atherosclerosis and hypertension, liver function stimulation, hangover removal, anti-fatigue, anti-stress, anti-aging, brain activity stimulation, anti-inflammatory activity, treatment of allergic diseases, and stimulation of protein synthesis.

Plant-extracted functional substances, such as vitamins, carotenoids, polyphenols, and anthocyanins, which show pharmacological effects, including in vivo antioxidative activity, immunity boosting, anticancer activity, and prevention of heart diseases, are mostly classified as secondary metabolites. Similarly, ginsenosides obtained from ginseng are also classified as secondary metabolites. The kind and content of secondary metabolites vary depending on the kind of plant, and the structure of secondary metabolites changes depending on the intensity of biological/non-biological stress, even when the secondary metabolites originate from the same plant species.

It was reported that red ginseng or black ginseng, which are prepared by steaming fresh ginseng, have an increased content of ginsenosides, as compared to fresh ginseng, and contain components that are present in trace amounts in fresh ginseng or absent in fresh ginseng.

Some conventional methods of preparing red ginseng or black ginseng from fresh ginseng attempted to increase the content of crude saponins or specific ginsenoside components by changing conditions, including steaming temperature and time, the number of treatments, etc. In addition, some conventional methods attempted to increase the content of ginsenosides by performing treatments, such as lactic acid bacteria inoculation, irradiation, or far-infrared ray irradiation, during processing of ginseng.

As described above, conventional studies on the functional substances of ginseng have been focused on increasing the content of ginsenosides by various treatments during processing, rather than producing high-quality raw ginseng by treatment during cultivation. In other words, conventional studies on increasing the content of ginsenosides are not significantly deviating from methods of treating the harvested root zone by various processes during processing.

Such conventional methods are not effective in increasing the content of all functional substances, and instead, are effective only in increasing the content of some specific ginsenosides. In addition, such conventional processes have the negative effect of reducing the content of functional substances other than the specific ginsenosides.

In some conventional technologies, studies focused on increasing the content of ginsenosides by irradiation with visible light from LEDs (Light Emitting Diodes) have been conducted, but results that demonstrate the effect of this irradiation have not yet been reported. The commercial application of the irradiation method is limited, due safety problems.

SUMMARY

An embodiment of the present invention relates to a plant cultivation apparatus that efficiently increases the content of ginsenosides in ginseng cultivation.

Another embodiment of the present invention relates to a plant cultivation apparatus that increases the content of specific plant components using UV light, during cultivation of plants such as ginseng.

In one embodiment, a plant cultivation apparatus for producing ginseng having a high content of ginsenoids includes: a guide rail disposed above a ginseng cultivation bed along the length direction of the ginseng cultivation bed; a movable unit coupled to the guide rail and configured to move on the guide rail; an arm unit, one end of which is coupled to the movable unit, and the other end of which is telescopically extendable from the movable unit toward a ginseng cultivation space above the ginseng cultivation bed; and a UV radiation unit coupled to the other end of the arm unit and configured to irradiate UV light in the wide direction of the ginseng cultivation bed for a specific period during cultivation or harvesting of ginseng.

The UV radiation unit may include: an ultraviolet light emitting diode (UV-LED) module configured to irradiate UV light; a substrate mounted with the UV-LED module; a heat-sink plate coupled to the substrate and configured to dissipate heat generated in the UV-LED module; and a reflecting plate coupled to the substrate or the heat-sink plate and configured to define the range of radiation of UV light from the UV-LED module.

The UV-LED module may be detachably coupled to the substrate.

The plant cultivation apparatus may further include a sensor configured to measure a distance between the UV radiation unit and the ginseng cultivation bed.

The plant cultivation apparatus may further include a control unit configured to control the length of the arm unit on the basis of distance information included in an output signal from the sensor.

The control unit may be configured to control the moving speed of the movable unit to a predetermined speed.

In another embodiment of the present invention, a plant cultivation apparatus includes: a shelf on which harvested ginseng is to be placed; a frame configured to support the shelf; and an UV radiation unit supported by the frame above the shelf and configured to irradiate UV light toward the shelf, wherein the UV radiation unit is configured to irradiate UV light at least once onto the whole plant or root zone of the harvested ginseng for a certain period of time during storage or before processing of the harvested ginseng.

The UV radiation unit may include: an ultraviolet light emitting diode (UV-LED) module configured to irradiate UV light; and a substrate mounted with the UV-LED module and supported by the frame above the shelf.

The plant cultivation apparatus may further include an LED illumination unit disposed integrally with the UV-LED module and configured to illuminate the shelf.

In still another embodiment, a plant cultivation apparatus includes: a guide rail disposed above a plant cultivation bed for cultivating a plant, along the length direction of the plant cultivation bed; a movable unit coupled to the guide rail and configured to move on the guide rail; an arm unit, one end of which is coupled to the movable unit, and the other end of which is telescopically extendable from the movable unit toward a plant cultivation space above the plant cultivation bed; and a UV radiation unit coupled to the other end of the arm unit and configured to irradiate UV light toward the plant cultivation bed for a specific period during cultivation or harvesting of the plant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

The terms or words used in the specification and claims should not be limited to be construed as usual or dictionary definition but should be rather construed to be consistent with the technical spirits of the present invention based on the principle that the inventors may properly define the terms used in the specification to describe their invention in the best manner.

Figure 1:
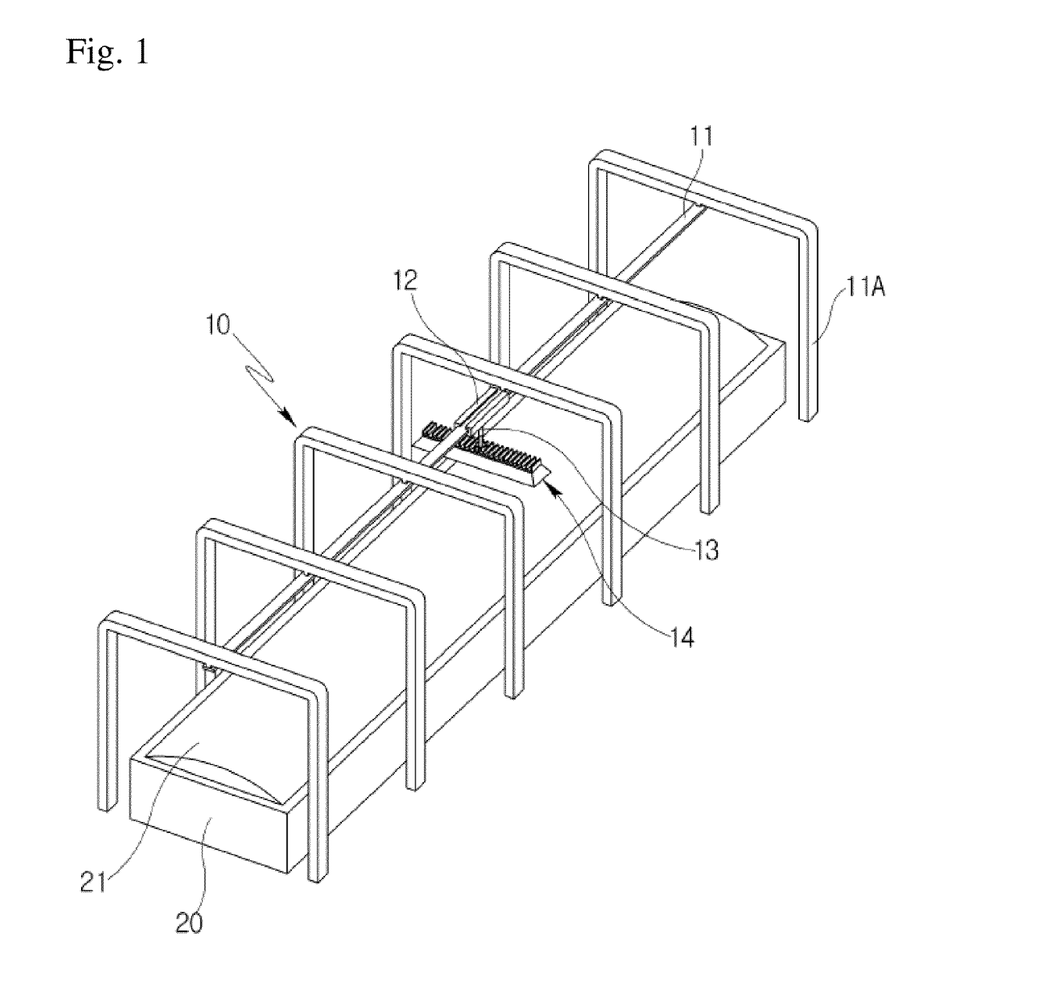
FIG. 1 is a perspective view of a ginseng cultivation apparatus according to an exemplary embodiment of the present invention.

FIG. 1 is a perspective view of a ginseng cultivation apparatus according to an exemplary embodiment of the present invention. Referring to FIG. 1, the ginseng cultivation apparatus includes a guide rail 11, a movable unit 12, an arm unit 13, and a UV radiation unit 14. The ginseng cultivation apparatus is configured to radiate UV light at least once onto ginseng cultivated in a ginseng cultivation space 21 of a ginseng cultivation bed 20.

The guide rail 11 is a monorail supported by a support structure 11A and is disposed above the ginseng cultivation space 21. The guide rail 11 may extend along the length direction of the ginseng cultivation space 21, which is longer than the width direction. However, when it is difficult to distinguish the length direction from the width direction, any one direction may be determined to be the length direction, and the guide rail 11 may be disposed along the determined length direction. Although one guide rail 11 is shown, according to some embodiments, multiple guide rails 11 may be provided.

In some exemplary embodiments, the guide rail 11 may also be disposed along the width direction of the ginseng cultivation bed 20. However, when the guide rail 11 is disposed along the width direction, the apparatus may be more complex than when the guide rail 11 is disposed along the length direction.

When a barrier is formed on a field for ginseng cultivation, the above-mentioned ginseng cultivation bed 20 may be either a support plate supporting the ridge or an element that corresponds to a support plate. Also, the ginseng cultivation space 21 may designate a ridge on which ginseng is planted.

In the case of hydroponic cultivation, the ginseng cultivation bed 20 may include: an internal space that stores a nutrient solution and through which the nutrient solution moves; and an upper plate (not shown) on which ginseng is planted/supported. In addition, in the case of hydroponic cultivation, the ginseng cultivation space 21 may correspond to the upper plate of the ginseng cultivation unit.

The guide rail 11 is shown to have a linear configuration for convenience of illustration and explanation, but the present invention it is not limited to this configuration, and the guide rail 11 may be provided in a linear configuration, a curved configuration or a combination thereof, above the ginseng cultivation space 21. The guide rail 11 is shown to be supported by the support structure 11A, but the present invention is not limited to this configuration, and the guide rail 11 may also be supported directly by a frame in ginseng production systems, including a general plant factory and a robot-based plant factory.

Figure 4:
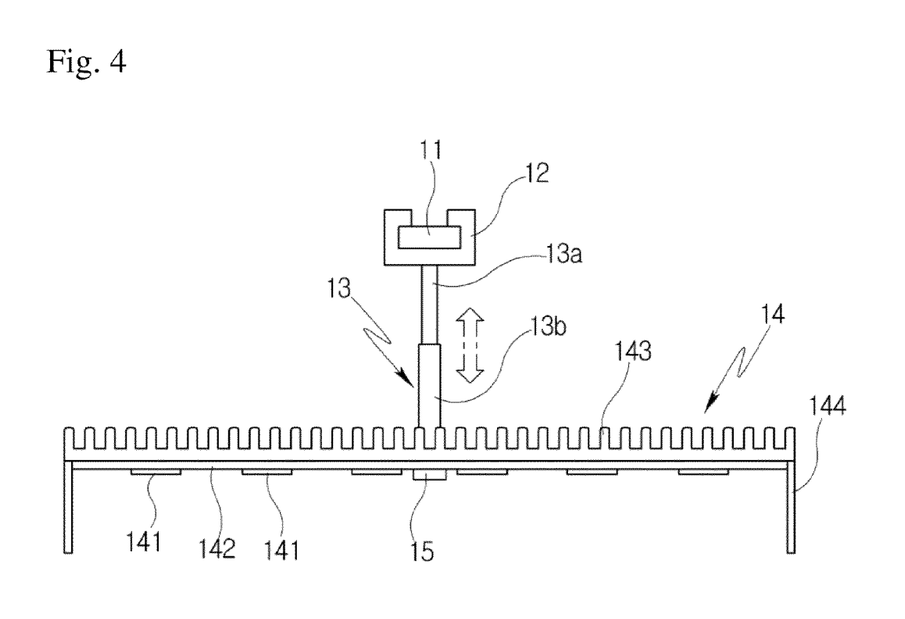
FIG. 4 is a cross-sectional view in the width direction of the ginseng cultivation apparatus of FIG. 2.
Figure 5:
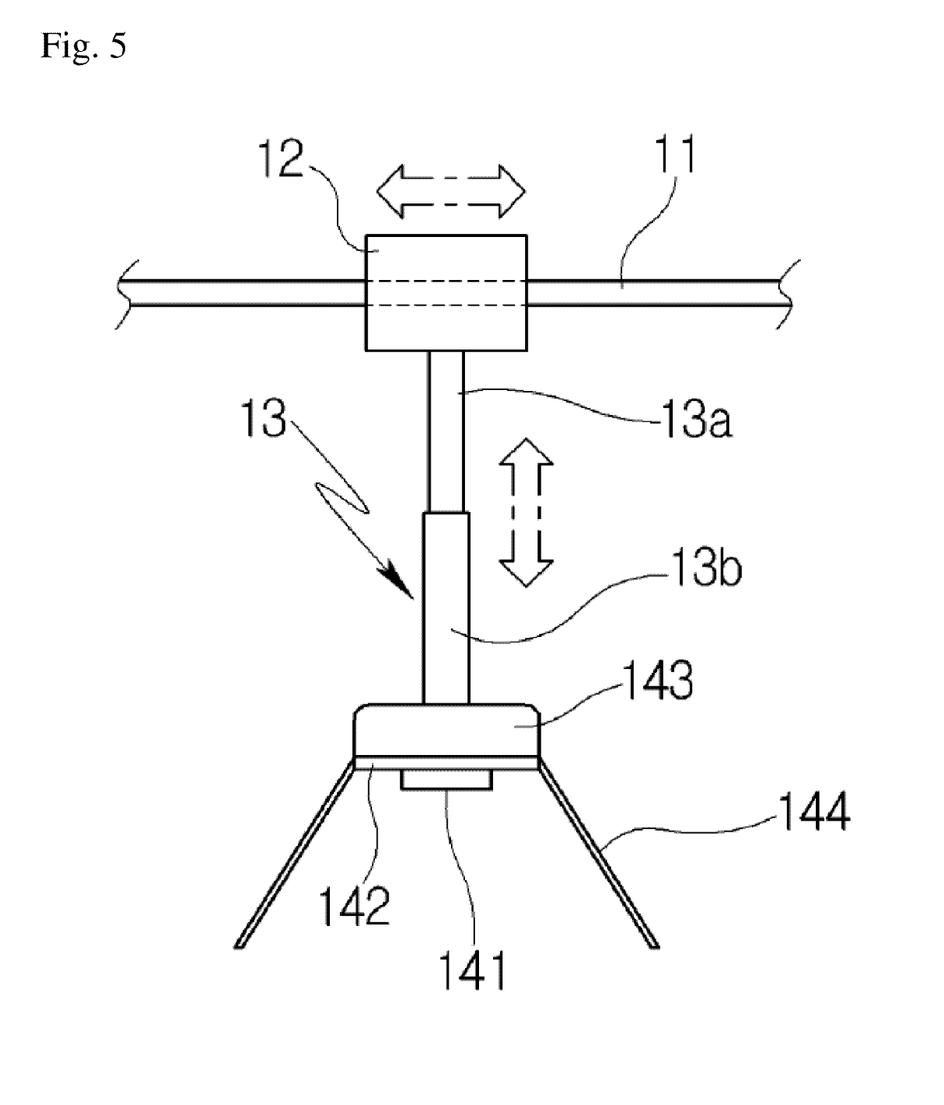
FIG. 5 is a cross-sectional view in the length direction of the ginseng cultivation apparatus of FIG. 2.

The movable unit 12 designates either a device that is coupled to the guide rail 11 and configured to move on the guide rail 11, or an element that operates in an equivalent manner (see FIGS. 4 and 5). In other words, the movable unit 12 includes a movable element that enables the UV radiation unit 14 to move forward and backward along the guide rail 11.

The arm unit 13 designates a device that connects the movable unit 12 to the UV radiation unit 14, or an element that operates in an equivalent manner (see FIGS. 4 and 5). In this embodiment, the arm unit 13 is configured such that its length is telescopically adjustable. When this arm unit 13 is used, the distance between the plant (ginseng) in the ginseng cultivation space 21 and the UV radiation unit 14 can be freely adjusted to a desired distance. The arm unit 13 is shown to extend downward toward the ground surface. However, the present invention is not limited to this configuration, and the arm unit 13 may be configured so as to extend in various directions (e.g., lateral directions) in some embodiments of the ginseng cultivation apparatus.

The UV radiation unit 14 serves to radiate UV light onto the ginseng planted in the ginseng cultivation space 21. The UV radiation unit 14 may comprise at least one LED that emits at least one of UV-A light (about 320-400 nm), UV-B light (about 280-320 nm), and UV-C light (about 100-280 nm). The UV radiation unit 14 will be described in more detail later.

Figure 2:
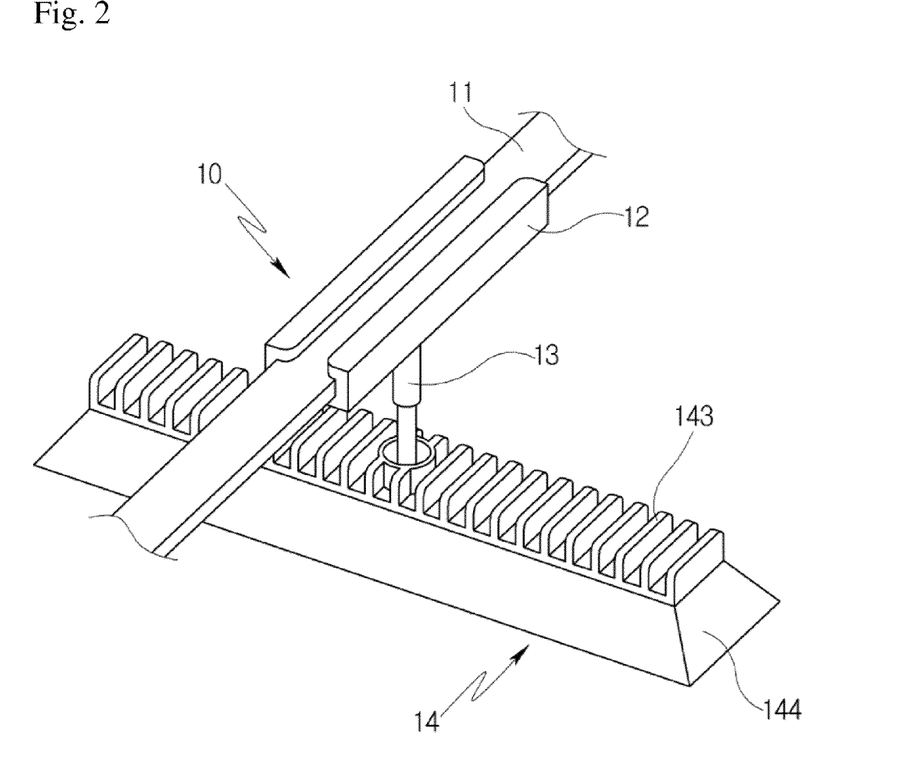
FIG. 2 is a partially enlarged perspective view of the ginseng cultivation apparatus of FIG. 1.
Figure 3:
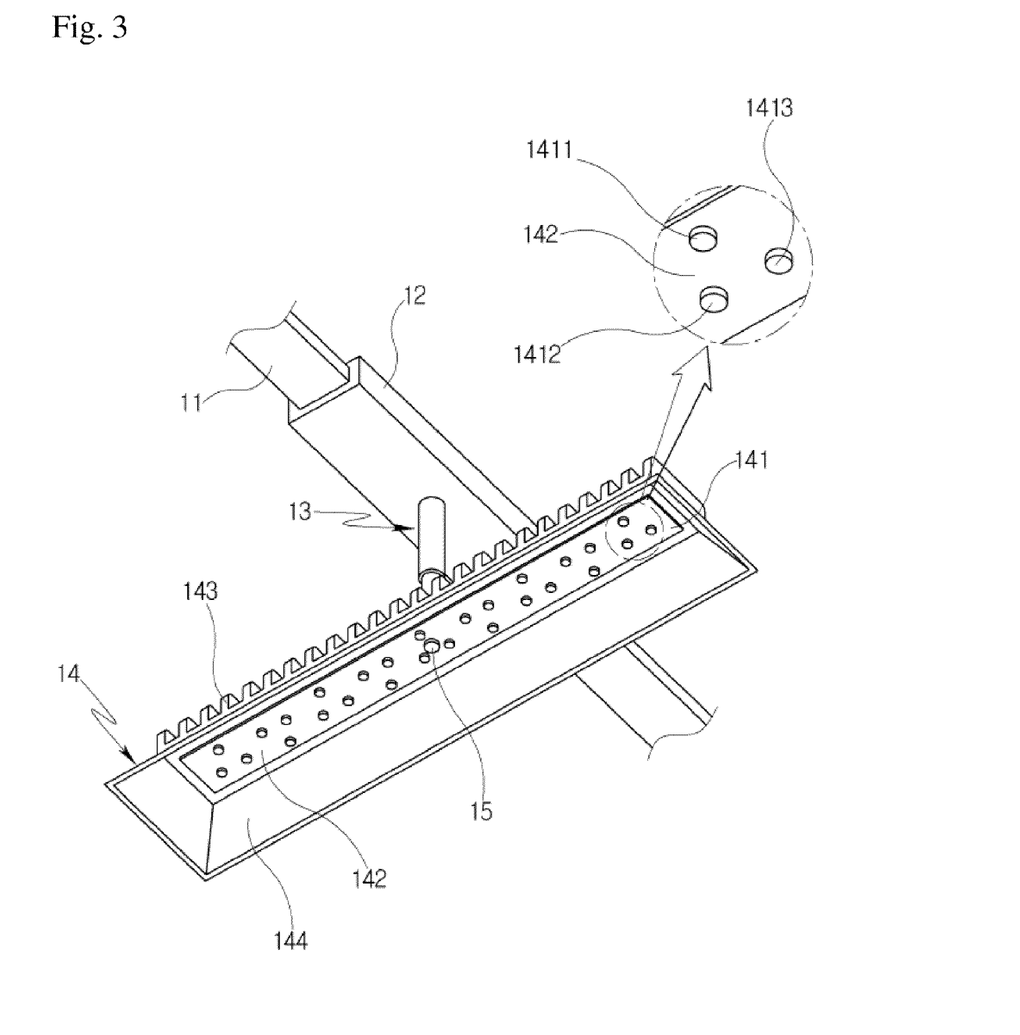
FIG. 3 is a perspective view from the bottom of the ginseng cultivation apparatus of FIG. 2.

FIG. 2 is a partially enlarged perspective view of the ginseng cultivation apparatus of FIG. 1. FIG. 3 is a perspective view from the bottom of the ginseng cultivation apparatus of FIG. 2.

Referring to FIGS. 2 and 3, the ginseng cultivation apparatus comprises the guide rail 11, the movable unit 12, the arm unit 13, and the UV radiation unit 14. Herein, the UV radiation unit 14 comprises a UV-LED (Ultraviolet Light Emitting Diode) module 141, a substrate 142 on which the UV-LED module 141 is mounted, a heat-sink plate 143 coupled to the substrate 142 and serving to dissipate heat generated in the UV-LED module 141, and a reflecting plate 144 coupled to the substrate 142 or the heat-sink plate 143 and serving to define the range of UV radiation from the UV-LED module 141.

The UV-LED module 141 may comprise a first LED 1411 that emits UV-A light, a second LED 1412 that emits UV-B light or UV-C light, and a third LED 1413 that emits visible light. The first and second LEDs 1411 and 1412 may be driven simultaneously with the third LED 1413, or these LEDs can be selectively/independently driven.

The UV-LED module 141 may be provided in the form of a metal can or injection-molded lead frame package that can be mounted on the surface of the substrate 142. Alternatively, the UV-LED module 141 may be mounted by through-hole mounting or provided in the form of a bare chip or a flip chip. In addition, the UV-LED module 141 may also be attached to a sub-mount substrate that is used to improve heat dissipation characteristics or electrical characteristics. In some embodiments, the UV-LED module 141 may also be disposed on the substrate 142 using a variety of conventional detachable sockets.

The substrate 142 designates a printed circuit board on which the UV-LED module 141 is mounted and wires, electrical elements, integrated circuits and the like, which are used for operation of the UV-LED module 141, are mounted. The substrate 142 may comprise a member or element that enables the UV-LED module 141 to be mounted integrally or detachably on the substrate 142.

The substrate 142 is formed of any one of a thermoelectric element, a plastic PCB (Printed Circuit Board), a ceramic substrate, and a metal substrate. In this embodiment, the thermoelectric element is made of a thermoelectric material and can operate as a cooling substrate that performs a cooling operation when supplied with a DC voltage. When the thermoelectric element is used, one side of the thermoelectric element can be cooled to, for example, −75° C., thus improving the heat dissipation characteristics of the UV-LED module 141.

The substrate 142 may comprise one or more of an anti-electrostatic circuit and an output control circuit (corresponding to driving unit) on at least one side thereof. Also, the substrate 142 may comprise an encapsulation material applied to the substrate 142, in order to protect at least one of the anti-electrostatic circuit and the output control circuit.

The heat-sink plate 143 serves to dissipate heat generated in the UV-LED module 141 or the substrate 142. The heat-sink plate 143 is coupled to the arm unit 13 to support the substrate 142 and the UV-LED module 141. The heat-sink plate 143 may comprise an element (e.g., central opening) for coupling to the arm unit 13. The heat-sink plate 143 may have a plurality of wing members attached to one side thereof and arranged in the width direction at approximately constant intervals. The heat-sink plate 143 may be formed of a material (e.g., metal material) having excellent thermal dissipation performance. The heat-sink plate 143 may be provided only at a position adjacent to the UV-LED module 141, and the length and width thereof are not limited to the shown configuration and can be adjusted according to actual conditions.

The reflecting plate 144 serves to control the direction of UV light radiated from the UV-LED module 141, to prevent a worker from being exposed to an excessive amount of UV light. The reflecting plate 144 may minimize the dispersion of emitted UV light, to increase energy efficiency. The reflecting plate 144 is disposed at the edges of the lower side of the heat-sink plate 143. In some embodiments, the reflecting plate 144 may be inclined at an angle with respect to the direction of gravity. The reflecting plate 144 may be made of a sheet-like or film member comprising a UV reflecting material. The material may be highly heat-resistant material and may be highly resistant to discoloration.

The reflecting plate 144 may comprise a cover (not shown) for protecting the UV-LED module 141 and/or the substrate 142. In this case, the cover may be disposed opposite the heat-sink plate 143, with the reflecting plate 144 interposed therebetween. The cover may be made of quartz or reinforced glass. The quartz may have a UV transmittance of about 98%, or higher, for deep ultraviolet light at a wavelength of 300 nm or less, and thus, is useful for protecting the UV-LED module 141 from an external shock. The reinforced glass may have a UV transmittance of about 90%, or higher, at a wavelength of 300 nm to 400 nm, and thus, is useful for protecting the UV-LED module 141 from an external shock.

As shown in FIG. 3, the ginseng cultivation apparatus further comprises a sensor 15. The sensor 15 serves to measure the distance between the UV radiation unit 14 or the UV-LED module 141 and the plant(s) of the ginseng cultivation space 21. The sensor 15 may be mounted on the substrate 142. In this case, the production costs can be reduced, as compared to when a separate sensor is used. The sensor 15 may be an ultrasonic proximity sensor, a distance measurement sensor, or the like.

FIG. 4 is a schematic cross-sectional view in a first direction (width direction) of the ginseng cultivation apparatus of FIG. 2. FIG. 5 is a schematic cross-sectional view in a second direction (length direction) perpendicular to the first direction of the ginseng cultivation apparatus of FIG. 2.

Referring to FIGS. 4 and 5, in the ginseng cultivation apparatus, the amount of UV light that is radiated from the UV-LED module 141 onto the plant (ginseng) of the ginseng cultivation space can be controlled by adjusting the speed of the movable unit 12 and/or adjusting the length of the arm unit 13.

The movable unit 12 may comprise any driving device capable of moving the movable unit 12 along, and coupling the movable unit 12 to, the guide rail 11. In some embodiments, the movable unit 12 may comprise a slide coupled to the guide rail 11, and a driving device connected to the slide by a rope or a chain, for example, to reciprocally move the slide. Herein, the driving device may be a motor or equivalent device.

The arm unit 13 comprises a first arm unit 13a and a second arm unit 13b, in order to adjust the length thereof. The first arm unit 13a is telescopically inserted into the second arm unit 13b in the length direction. Herein, one end of the first arm unit 13a is coupled to the movable unit 12, and one end of the second arm unit 13b is coupled to the heat-sink plate 143.

Figure 6:
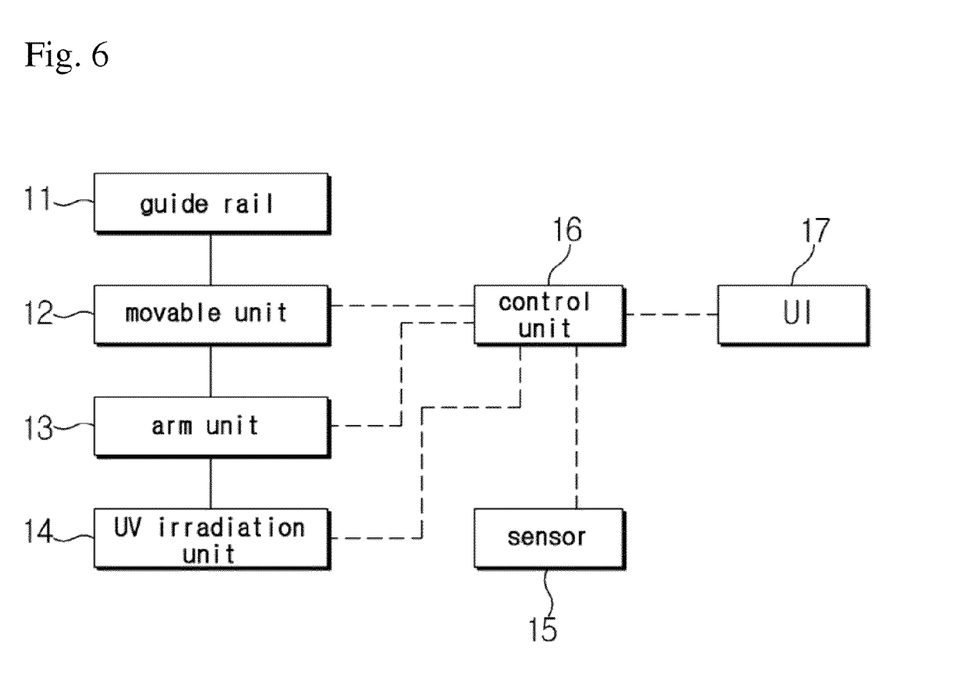
FIG. 6 is a block diagram of a ginseng cultivation apparatus according to an embodiment of the present invention.

FIG. 6 is a block diagram of a ginseng cultivation apparatus according to an exemplary embodiment of the present invention. Referring to FIG. 6, the ginseng cultivation apparatus comprises a guide rail 11, a movable unit 12, an arm unit 13, a UV radiation unit 14, a sensor 15, and a control unit 16.

In this embodiment, the guide rail 11, the movable unit 12, the arm unit 13, the UV radiation unit 14 and the sensor 15 can be substantially equal to the corresponding elements described above with reference to FIGS. 1 to 5, and thus, a detailed description thereof is omitted.

The control unit 16 is configured to control the length of the arm unit 13 on the basis of distance information contained in an output signal from the sensor 15. When the length of the arm unit 13 is controlled, the distance between the ginseng cultivation space 21 and the UV radiation unit 14 can be set to a desired distance, whereby the amount of UV radiation onto the ginseng cultivation space can be controlled.

Also, the control unit 16 is configured to control the moving speed of the movable unit 12. When the moving speed of the movable unit 12 is controlled, the amount of UV light that is radiated from the UV radiation unit 14 onto the ginseng cultivation space 21 can be controlled.

In addition, the control unit 16 may be connected to a user interface (UI) 17 that may include physical button(s) or a software-based control program. In this case, the control unit 16 may be configured to control the length of the arm unit 13 and/or the speed of the moving unit 12, on the basis of information inputted through the user interface 17.

According to this embodiment, UV irradiation in ginseng cultivation may be used to artificially apply non-biological stress, and the content of ginsenosides in ginseng can be increased, due to a biological response to the stress that is artificially applied upon UV irradiation. Similarly, it was reported that the contents of functional substances in various garden products, including strawberries, tomatoes, mushrooms, spinach, broccoli, and the like, were increased by UV irradiation.

An experiment on whether the content of ginsenosides in ginseng is increased by UV irradiation was performed, and the results of the experiment are shown in Table 1 below.

TABLE 1

| Treatment | Total ginsenoside content (mg/100 mg dry weight) | | |
| --- | --- | --- | --- |
| | Leaf | Stem | Root |
| Co | 14.08 | 0.88 | 1.58 |
| T1 | 126.69 | 0.92 | 1.94 |
| T2 | 105.03 | 0.90 | 1.73 |
| T3 | 114.57 | 0.91 | 1.77 |
| T4 | 135.01 | 0.94 | 2.03 |
| T5 | 132.55 | 0.93 | 2.01 |
| T6 | 129.13 | 0.93 | 1.98 |
| T7 | 133.32 | 0.93 | 2.01 |
| T8 | 128.03 | 0.92 | 1.98 |

In Table 1, Co indicates the content (average value) of ginsenosides in portions (leaf, stem and root) of a ginseng group of a comparative embodiment, and T1 to T8 indicate the content (average value) of ginsenosides in each portion of 8 exemplary ginseng groups obtained after radiating several $\mu Wcm^2$ to several $mWcm^2$ of UV light, for 5 minutes every day for 1 week, before harvesting, while maintaining the distance between the UV radiation unit and the ginsengs planted in the ginseng cultivation space 21 at 100-200 mm. The comparative ginseng group and the exemplary ginseng groups are 6-year-old ginseng plants cultivated in the same field.

As can be seen in Table 1 above, the content of ginsenosides in all the ginseng groups irradiated with UV light using the ginseng cultivation apparatus before harvesting the ginseng plants is higher than that in the ginseng cultivated by the conventional method.

In this embodiment, ginseng is irradiated with UV light for 5 minutes every day during 1 week before harvesting, but the scope of the present invention is not limited to this configuration. For example, ginseng may also be irradiated with UV light for 5 minutes every other day during 2 weeks before harvesting.

Figure 7:
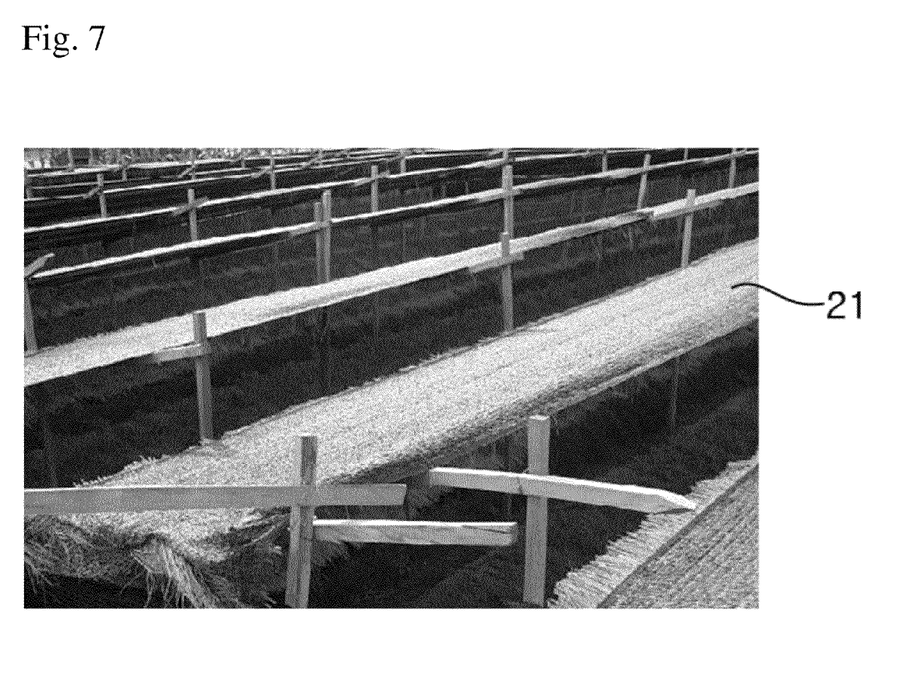
FIGS. 7 and 8 illustrate a ginseng cultivation environment to which a ginseng cultivation apparatus according to the present invention can be applied.
Figure 8:
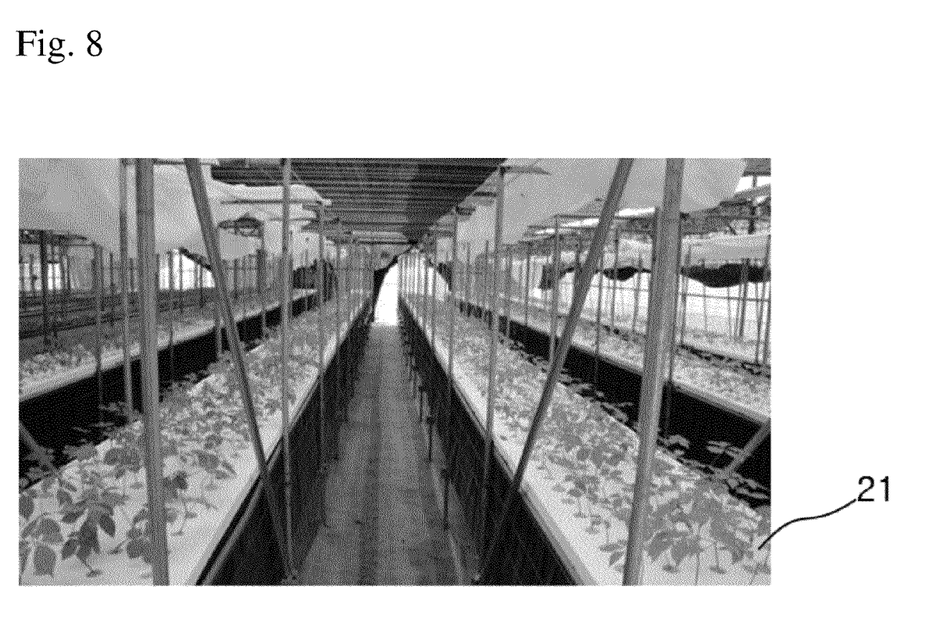

FIGS. 7 and 8 illustrate a ginseng cultivation environment to which the ginseng cultivation apparatus according to the present invention can be applied. Referring to FIG. 7, the ginseng cultivation apparatus according to the present invention can be provided above the ginseng cultivation space 21 that employs a traditional cultivation method. The traditional cultivation method refers to a ginseng cultivation system constructed by making ridges at a ginseng cultivation site, planting ginseng seedlings into the ridges, and disposing a sunlight-blocking sheet above the planted ginseng seedlings.

Referring to FIG. 8, the ginseng cultivation can be provided above the ginseng cultivation space 21 that employs a conventional hydroponic cultivation method. The hydroponic cultivation method refers to hydroponically cultivating ginseng by supplying a nutrient solution to a ginseng cultivation bed.

The system for hydroponically cultivating ginseng preferably comprises a vinyl house, a green house, or a plant factory; in which ginseng can be cultivated in all the seasons and the cultivation environment can be automatically controlled. In other words, the system for hydroponically cultivating ginseng may comprise temperature/humidity control units, a ventilation unit, cooling/heating units, a light-shielding unit, a complex environment control unit, a unit for automatically supplying a nutrient solution, water supply/drain units, a nutrient solution recycling unit, and the like.

Figure 9:
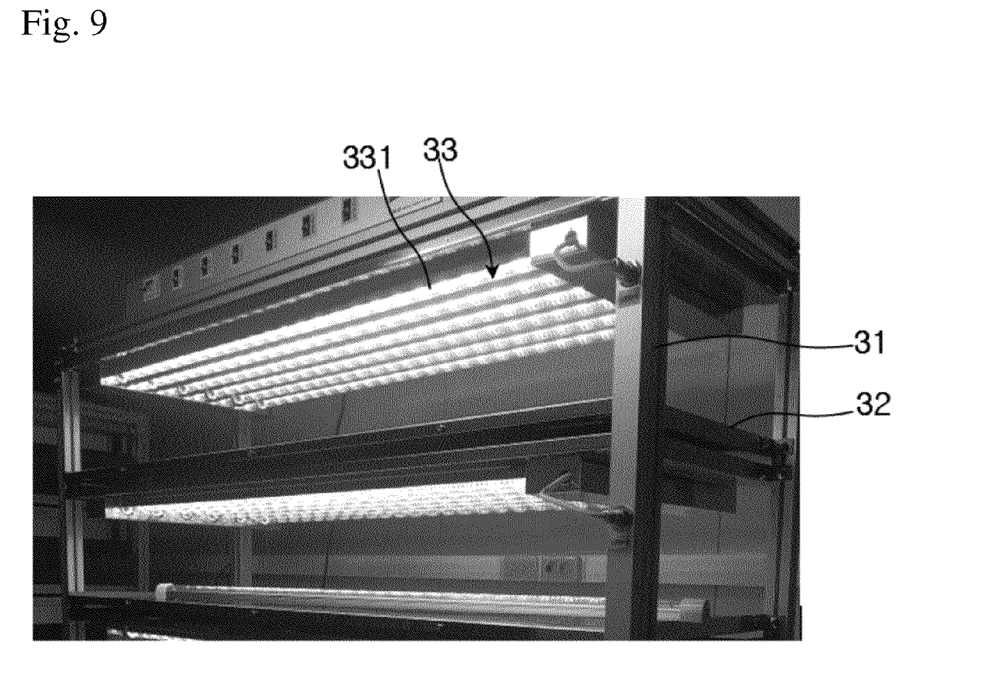
FIG. 9 shows a ginseng cultivation apparatus according to various embodiments of the present invention.

FIG. 9 shows a ginseng cultivation apparatus according to another embodiment of the present invention. Referring to FIG. 9, the ginseng cultivation apparatus comprises a frame 31, a shelf 32, and a UV radiation unit 33. The ginseng cultivation apparatus is placed in any space in a warehouse or plant factory in which harvested ginseng is stored before processing. The ginseng cultivation apparatus is configured to radiate UV light at least once onto the whole plant of harvested ginseng, or the root zone of harvested ginseng, on the shelf before processing the ginseng.

The frame 31 may be placed in any place in a warehouse or plant factory in which harvested ginseng is stored before processing. The frame 31 may have a multi-stage structure.

The shelf 32 is fixed to the frame 31 at any level so that harvested ginseng can be placed on the upper side thereof. The shelf 32 is supported by the frame 31.

The UV radiation unit 33 is supported by the frame 31 so that it can irradiate UV light onto harvested ginseng on the shelf 32. For example, the UV radiation unit 33 is configured to irradiate several μWcm² to several mWcm² of UV light at least once onto harvested ginseng on the shelf 32.

The UV radiation unit 33 may comprise a UV-LED module 331 for irradiating UV light, a substrate on which the UV-LED module 331 is detachably fixed, and a power supply unit or driving unit for supplying power to the substrate or the UV-LED module 331 or controlling the operation of the UV-LED module 331.

The UV-LED module 331 and the substrate can be substantially equal to the corresponding elements of the UV radiation unit 14 described above with reference to FIGS. 3 to 5, and thus the detailed description thereof is omitted. In addition, the power supply unit or driving unit for supplying power to the UV-LED module 331 or controlling the operation of the UV-LED module 331 is well known in the LED field, and thus, a detailed description thereof is omitted.

The ginseng cultivation apparatus is configured to increase the content of ginsenosides in ginseng, by radiating UV light one or more times onto harvested ginseng (having or not having leaves), during storage, and before processing or shipping. For effective UV irradiation, the ginseng cultivation apparatus preferably comprises a UV-LED module (see reference numeral 141 in FIG. 2), like a conventional structure having a visible LED, so that the same amount of UV light is irradiated onto ginseng individuals.

When the ginseng cultivation apparatus is used, the content of ginsenosides in ginseng can be increased, as compared to that in conventional ginseng by irradiating ginseng with UV light, before processing ginseng. In other words, based on the fact that ginseng is a living organism before ingestion or processing, the ginseng cultivation apparatus is based on the defense mechanism of organisms against stress, and can increase the content of various ginsenosides in ginseng, as compared to that in conventional ginseng (raw ginseng), by irradiating ginseng with a suitable level of UV light before processing the ginseng.

While it has been described in the above embodiments that the content of ginsenosides in ginseng is increased by irradiating ginseng with UV light before ginseng processing, the ginseng cultivation apparatus is not limited to this configuration and may be used to increase the content of specific components in various plants (eatable plants) or to change the structure of components, like the case of ginseng. In this case, the ginseng cultivation apparatus can be referred to as a plant cultivation apparatus for cultivating any plant.

As described above, the ginseng cultivation apparatus according to the present invention is a result of research focused on increasing the content of ginsenosides in ginseng, by treating ginseng before processing of ginseng, that is, during cultivation or post-harvest storage of ginseng, and has the effect of increasing the content of ginsenosides in ginseng by radiating a specific amount of UV light at least once onto ginseng.

In addition, the plant cultivation device according to the embodiment of the present invention has the effect of appropriately modifying the component of a plant by irradiating UV light during cultivation of the plant, like the case of ginseng.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A plant cultivation apparatus comprising:
a guide rail disposed above a cultivation bed and extending along the length direction of the cultivation bed;
a movable unit coupled to the guide rail and configured to move along the guide rail;
an arm unit comprising a first end that is coupled to the movable unit, and a second end that is extendable from the movable unit toward the cultivation bed;
an ultraviolet (UV) radiation unit coupled to the second end of the arm unit and configured to irradiate the cultivation bed with a set amount of UV light;
a sensor configured to measure a distance between the UV radiation unit and the cultivation bed; and
a control unit configured to control a length of the arm unit according to distance information included in an output signal of the sensor, and to control a speed at which the movable unit moves along the guide rail such that the entire cultivation bed is irradiated with substantially the same amount of UV light.

2. The plant cultivation apparatus of claim 1, wherein the UV radiation unit comprises:
a substrate;
an ultraviolet light emitting diode (UV-LED) module disposed on the substrate and configured to emit the UV light;
a heat-sink plate coupled to the substrate and configured to dissipate heat generated by the UV-LED module; and
a reflecting plate coupled to the substrate or the heat-sink plate and configured to direct the UV light towards the cultivation bed.

3. The plant cultivation apparatus of claim 2, wherein the UV-LED module is detachably coupled to the substrate.

4. The plant cultivation apparatus of claim 1, wherein the amount of the UV light is sufficient to increase the content of ginsenosides in ginseng disposed on the cultivation bed.

5. A plant cultivation apparatus comprising:
a shelf;
a frame configured to support the shelf;
an ultraviolet (UV) radiation unit disposed on the frame above the shelf and configured to irradiate plant material disposed on the shelf with UV light for period of time before the plant material is processed, the UV radiation unit comprising an ultraviolet light emitting diode (UV-LED) module comprising a first LED that emits UV-A light and a second LED that emits UV-B light or UV-C light;
a moveable unit disposed on the frame and configured to move the UV irradiation unit with respect to the shelf; and
a control unit configured to control the moveable unit and the UV radiation unit, such that the plant material is irradiated with an amount of UV light sufficient to increase the content of ginsenosides in the plant material,
wherein the plant material comprises harvested ginseng.

6. The plant cultivation apparatus of claim 5, wherein the UV radiation unit further comprises a substrate disposed on the frame, above the shelf, and on which the UV-LED module is disposed.

7. The plant cultivation apparatus of claim 6, further comprising an LED illumination unit disposed integrally with the UV-LED module and configured to illuminate the shelf.

8. A plant cultivation apparatus comprising:
a guide rail disposed above a cultivation bed and extending along the length direction of the cultivation bed;

a movable unit disposed on the guide rail and comprising a driving device configured to move the movable unit along the guide rail;

an arm unit comprising a first end that is coupled to the movable unit, and a second end that is extendable from the movable unit toward the cultivation bed; and an ultraviolet (UV) radiation unit coupled to the second end of the arm unit and configured to irradiate the cultivation bed with UV light, the UV radiation unit comprising a first LED that emits UV-A light and a second LED that emits UV-B light or UV-C light;

a sensor configured to measure a distance between the UV radiation unit and the cultivation bed; and a control unit configured to control a length of the arm unit according to distance information included in an output signal of the sensor, and to control a speed at which the driving device moves the movable unit along the guide rail such that the entire cultivation bed is irradiated with substantially the same amount of UV light.

9. The plant cultivation apparatus of claim 8, wherein the amount of the UV light is sufficient to increase the content of ginsenosides in ginseng disposed on the cultivation bed.

\* \* \* \* \*